Patented Sept. 13, 1932

1,877,166

UNITED STATES PATENT OFFICE

LOUIS FREEDMAN, OF FAR ROCKAWAY, NEW YORK, AND ALFRED E. SHERNDAL, OF UPPER MONTCLAIR, NEW JERSEY, ASSIGNORS TO H. A. METZ LABORATORIES, INC., OF NEW YORK, N. Y., A CORPORATION OF NEW YORK

REDUCTION OF 4-NITROSO-1-PHENYL-2.3-DIMETHYL-5-PYRAZOLONE

No Drawing.   Application filed July 25, 1931.   Serial No. 553,194.

The present invention relates to a new method for the reduction of 4-nitroso-1-phenyl-2.3-dimethyl-5-pyrazolone to the corresponding 4-amino compound.

4 - amino-1-phenyl-2.3-dimethyl-5-pyrazolone may be technically prepared by reducing the 4-nitroso compound with zinc dust and acid, or with salts of hydrosulfurous acid or zinc dust and sodium bisulfite or with gaseous hydrogen sulfide. In order to isolate the easily water-soluble amino compound from the reduction mixture, troublesome operations like concentration or extraction by means of an organic solvent and crystallization are necessary. The disadvantages of the use of free hydrogen sulfide for reduction on a technical scale are obvious. Special precautions and apparatus are necessary.

We discovered that the alkali metal salts of hydrogen sulfide can be successfully used for the reduction of the nitroso compound in a manner which is technically feasible and yielding the amino compound directly in crystalline form, of a high grade of purity, and in excellent yield without extraction by means of organic solvents.

This new method is carried out by reducing the nitroso compound with sodium hydrosulfide or with sodium sulfide, or—which is of greater advantage—by using a mixture of sodium hydrosulfide and sodium sulfide.

Instead of using sodium hydrosulfide as prepared from sodium sulfide and $H_2S$, or the mixture of sodium hydrosulfide and sodium sulfide, we found it of greater technical advantage to use sodium sulfide and to have in the nitroso mixture a sufficient amount of acid present to convert part of the sodium sulfide into sodium hydrosulfide thus maintaining in the reaction a mixture of sodium hydrosulfide and sodium sulfide.

The crystalline form of sodium sulfide containing water of crystallization is preferably used either in solid form or in such a concentration that part of the salt dissolves while the reduction is going on. In this way, the negative heat of solution of the crystalline sulfide counteracts the heat liberated during the reduction, making cooling from outside unnecessary. The concentration of the inorganic salts is such that at the end of the reduction the amino compound is automatically salted out in crystalline and pure form and can be filtered off. If necessary, additional alkali or salt is added in order to salt out the amino compound completely. Thus, extraction with a solvent is fully avoided.

The nitroso compound, prepared according to the methods described below, may be reduced in the original mixture without isolating, or if desired, it may be isolated by filtration. The amount of acid required to convert sodium sulfide into sodium hydrosulfide can be added either before the nitrosation is started or if desired can be mixed in with the nitroso compound after nitrosation has been completed.

In order to illustrate further our invention, the following examples are given:

*Example 1.*—188 grams of 1-phenyl-2.3-dimethyl-5-pyrazolone are added to 250 cc. of water and dissolved by the addition of 56 grams of sulfuric acid 66° Bé. Sufficient ice is added to cool to 0° C. and to maintain a temperature of 0–5° C. during the addition of sodium nitrite solution of about 40% by volume strength. The end of the nitrosation is indicated by a slight blue color on starch iodide paper.

This nitroso mixture can be either used directly for the reduction, or if desired, the nitroso compound can be filtered off to remove impurities dissolved in the mother liquor. In this latter case the filtered nitroso compound is pasted up with water and ice to a smooth mixture with a temperature of 2–5° C. To this mixture or to the original nitroso mixture as obtained from the nitrosation are added within a few minutes 625 grams of crystalline sodium sulfide

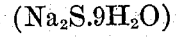
($Na_2S.9H_2O$)

in solid form. Within five minutes the mixture becomes decolorized to a light greenish-yellow and then to a bright yellow. The temperature remains at 0–2° C. until all the sodium sulfide crystals have dissolved, which takes from 35 to 45 minutes. After complete solution of the sodium sulfide there is a sharp rise in temperature to about 15° C.

after which the rise becomes gradual until room temperature is reached, when the temperature remains constant. The mixture is allowed to stir for about a total of six hours. The amino compound which first precipitates out in the form of oily yellow globules soon solidifies and settles to the bottom of the reaction vessel. The alkaline supernatant liquor is drawn off and the granules of 4-amino-1-phenyl-2.3-dimethyl-5-pyrazolone are pressed on a filter and washed with brine solution to remove adhering caustic solution.

*Example 2.*—188 grams of 1-phenyl-2.3-dimethyl-5-pyrazolone are added to 250 cc. of water and dissolved by the addition of 56 grams of sulfuric acid 66° Bé. Sufficient ice is added to cool to 0° C. and to maintain a temperature of 0-5° C. during the addition of sodium nitrite solution of about 40% by volume strength. The end of the nitrosation is indicated by a slight blue color on starch iodide paper.

This nitroso mixture can be either used directly for the reduction, or if desired, the nitroso compound can be filtered off to remove impurities dissolved in the mother liquor. In this latter case the filtered nitroso compound is pasted up with water and ice to a smooth mixture with a temperature of 2–5° C. To the well-cooled mixture containing the nitroso compound are added with efficient stirring 550 cc. of 30% sodium hydrosulfide solution. There is a sharp rise in temperature to about 18° C. and the green nitroso compound is decolorized and the mixture turns yellow with a yellow precipitate of sulfur in suspension. After a few minutes the yellow precipitate dissolves to give the mixture a yellow to orange color. The mixture is stirred for 1½ to 2 hours during which time droplets of the oily amino compound separate out, finally solidifying to crystalline granules. The finished 4-amino-1-phenyl-2.3-dimethyl-5-pyrazolone is salted out by addition of sufficient alkali or concentrated sodium chloride solution, after which the finished product may be filtered from the mother liquor, or the product may be extracted by means of benzol, or other organic solvent.

*Example 3.*—188 grams of 1-phenyl-2.3-dimethyl-5-pyrazolone are added to 250 cc. of water and dissolved by the addition of 56 grams of sulfuric acid 66° Bé. Sufficient ice is added to cool to 0° C. and to maintain a temperature of 0-5° C. during the addition of sodium nitrite solution of about 40% by volume strength. The end of the nitrosation is indicated by a slight blue color on starch iodide paper.

This nitroso mixture can be either used directly for the reduction, or if desired, the nitroso compound can be filtered off to remove impurities dissolved in the mother liquor. In this latter case the filtered nitroso compound is pasted up with water and ice to a smooth mixture with a temperature of 2–5° C. The well-cooled nitroso mixture is added with strong stirring to a mixture containing 300 cc. of 30% sodium hydrosulfide solution and 360 grams of crystalline sodium sulfide. The green nitroso compound decolorizes and dissolves to give a mixture containing an amorphous yellow precipitate in suspension which, after a few minutes, dissolves to give a yellow, clear solution. The temperature rises to about 18–19° C. After about ½ hour droplets of the oily amino compound form and then solidify to crystalline granules. The reduction is complete in about two hours, after which about 250 cc. of 40° Bé. caustic soda solution is added to completely salt out the amino compound remaining in solution. The amino compound is then filtered and washed with a small amount of brine solution to remove adhering alkali. The 4-amino-1-phenyl-2.3-dimethyl-5-pyrazolone thus obtained may be further purified or utilized as such for further chemical operations.

*Example 4.*—188 grams of 1-phenyl-2.3-dimethyl-5-pyrazolone are added to 250 cc. of water and dissolved by the addition of 56 grams of sulfuric acid 66° Bé. To this solution are added 70 grams of sulfuric acid 66° Bé. in excess diluted with 40 grams of ice. Sufficient ice is added to cool to 0° C. and nitrosified with sodium nitrite solution as described in Example 1. After nitrosation is finished, the nitroso mixture is stirred for one to one and a half hours at 0–5° C. It is then added in portions over a period of 5 to 8 minutes to 700 grams of crystalline sodium sulfide, suspended in 250 cc. water and well agitated. The nitroso decolorizes very quickly so that by the time all the nitroso has been added, the mixture has turned to a deep yellow, containing a precipitate of sulfur. After a few minutes the precipitate of sulfur redissolves to give an orange-yellow solution. The amino compound precipitates soon in the form of a light, yellow oil which solidifies to crystalline granules after stirring for about one hour. During the reduction the temperature is practically automatically controlled by the negative heat of solution of the crystalline sodium sulfide. The maximum temperature reached is not over 30° C. The 4-amino-1-phenyl-2.3-dimethyl-5-pyrazolone thus obtained is filtered off and washed with some brine solution. If necessary, some 40° Bé. caustic alkali solution is added before filtration in order to insure complete precipitation. The filtered amino compound is light yellow in color, of crystalline structure, and of a high grade of purity.

What we claim is:

1. A process of reducing 4-nitroso-1-phenyl-2.3-dimethyl-5-pyrazolone to the corresponding 4-amino compound by means of alkali metal salts of hydrogen sulfide, which process comprises causing 4-nitroso-1-phenyl-2.3-dimethyl-5-pyrazolone to react with alkali metal salts of hydrogen sulfide.

2. A process of reducing 4-nitroso-1-phenyl-2.3-dimethyl-5-pyrazolone to the corresponding 4-amino compound, which process comprises causing 4-nitroso-1-phenyl-2.3-dimethyl-5-pyrazolone to react with sodium sulfide.

3. A process of reducing 4-nitroso-1-phenyl-2.3-dimethyl-5-pyrazolone to the corresponding 4-amino compound, which process comprises causing 4-nitroso-1-phenyl-2.3-dimethyl-5-pyrazolone to react with sodium hydrosulfide.

4. A process of reducing 4-nitroso-1-phenyl-2.3-dimethyl-5-pyrazolone to the corresponding 4-amino compound, which process comprises causing 4-nitroso-1-phenyl-2.3-dimethyl-5-pyrazolone to react with an aqueous solution of sodium sulfide of the formula $Na_2S.9H_2O$.

5. A process of reducing 4-nitroso-1-phenyl-2.3-dimethyl-5-pyrazolone to the corresponding 4-amino compound, which process comprises causing 4-nitroso-1-phenyl-2.3-dimethyl-5-pyrazolone to react with a mixture of sodium sulfide and sodium hydrosulfide.

6. A process of reducing 4-nitroso-1-phenyl-2.3-dimethyl-5-pyrazolone to the corresponding 4-amino compound by means of a mixture of sodium sulfide and sodium hydrosulfide, which process comprises causing sodium sulfide to react with a watery suspension of 4-nitroso-1-phenyl-2.3-dimethyl-5-pyrazolone, said suspension containing an amount of sulfuric acid sufficient to convert part of the sodium sulfide into sodium hydrosulfide during the reaction, care being taken that the reaction temperature does not rise above 30° C.

7. A process of reducing 4-nitroso-1-phenyl-2.3-dimethyl-5-pyrazolone to the corresponding 4-amino compound by means of a mixture of sodium sulfide and sodium hydrosulfide, which process comprises pouring with stirring a watery suspension of 4-nitroso-1-phenyl-2.3-dimethyl-5-pyrazolone into a watery suspension of crystals of sodium sulfide of the formula $Na_2S.9H_2O$, said watery suspension of 4-nitroso-1-phenyl-2.3-dimethyl-5-pyrazolone containing an amount of sulfuric acid sufficient to convert part of the sodium sulfide into sodium hydrosulfide during the reaction, in which process the negative heat of solution of the sodium sulfide prevents the reaction temperature to rise above 30° C.

In testimony whereof we affix our signatures.

LOUIS FREEDMAN.
ALFRED E. SHERNDAL.